United States Patent
Akiyama et al.

(10) Patent No.: US 9,858,339 B2
(45) Date of Patent: Jan. 2, 2018

(54) INFORMATION PROVIDING SYSTEM, IDENTIFICATION INFORMATION RESOLUTION SERVER AND MOBILE TERMINAL DEVICE

(75) Inventors: Hitoshi Akiyama, Hamamatsu (JP);
Hiroyuki Iwase, Hamamatsu (JP);
Takeshi Sakai, Hamamatsu (JP);
Takuro Sone, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 14/110,069

(22) PCT Filed: Mar. 28, 2012

(86) PCT No.: PCT/JP2012/058259
§ 371 (c)(1),
(2), (4) Date: Oct. 4, 2013

(87) PCT Pub. No.: WO2012/137654
PCT Pub. Date: Oct. 11, 2012

(65) Prior Publication Data
US 2014/0039654 A1 Feb. 6, 2014

(30) Foreign Application Priority Data
Apr. 5, 2011 (JP) ................. 2011-083976

(51) Int. Cl.
*G06F 17/00* (2006.01)
*G06F 17/30* (2006.01)
(Continued)

(52) U.S. Cl.
CPC ... *G06F 17/30743* (2013.01); *G06Q 30/0239* (2013.01); *H04H 60/48* (2013.01);
(Continued)

(58) Field of Classification Search
CPC ........ G06F 17/30743; G04N 21/41407; G04N 21/44204; G04N 21/42203;
(Continued)

(56) References Cited

U.S. PATENT DOCUMENTS 5,612,729 A * 3/1997 Ellis et al. .............. 725/22
6,163,803 A 12/2000 Watanabe
(Continued)

FOREIGN PATENT DOCUMENTS

CN 1744606 A 3/2006
CN 101379484 A 3/2009
(Continued)

OTHER PUBLICATIONS

Notification of Reasons for Refusal issued in JP2012084062, dated Jan. 6, 2015. English translation provided.
(Continued)

*Primary Examiner* — Paul McCord
(74) *Attorney, Agent, or Firm* — Rossi, Kimms & McDowell LLP

(57) ABSTRACT

An information providing system includes a sound emission device for emitting, as sound wave, identification information modulated into a sound signal, an identification information resolution server including a mapping table in which the identification information, valid time information and the address information of a content are stored to be associated, and a mobile terminal device for transmitting the identification information demodulated from a picked-up sound wave to the identification information resolution server thereby obtaining address information and accessing the content using the obtained address information. When received the identification information from the mobile terminal device, the identification information resolution server returns the address information of a corresponding
(Continued)

content to the mobile terminal device when the time information is within a valid time.

5 Claims, 7 Drawing Sheets

(51) Int. Cl.
*H04N 21/414* (2011.01)
*H04N 21/442* (2011.01)
*H04N 21/422* (2011.01)
*H04N 21/4784* (2011.01)
*H04N 21/439* (2011.01)
*G06Q 30/02* (2012.01)
*H04H 60/48* (2008.01)
*H04H 60/58* (2008.01)

(52) U.S. Cl.
CPC ...... *H04H 60/58* (2013.01); *H04N 21/41407* (2013.01); *H04N 21/42203* (2013.01); *H04N 21/4394* (2013.01); *H04N 21/44204* (2013.01); *H04N 21/4784* (2013.01); *H04H 2201/37* (2013.01)

(58) Field of Classification Search
CPC ........... G04N 21/4784; G04N 21/4394; G06Q 30/0239; H04H 60/48; H04H 60/58; H04H 2201/37
USPC .......................................................... 700/94
See application file for complete search history.

(56) References Cited

U.S. PATENT DOCUMENTS

| | | | |
|---|---|---|---|
| 7,324,824 B2* | 1/2008 | Smith et al. ................ 455/456.1 | |
| 8,046,257 B2* | 10/2011 | Wane ..................... G06Q 20/10 | 705/14.1 |
| 8,484,670 B2* | 7/2013 | Klein .................... H04N 21/478 | 725/100 |
| 8,508,357 B2* | 8/2013 | Srinivasan ............. G06Q 30/02 | 340/534 |
| 8,930,003 B2* | 1/2015 | Krug et al. ....................... 700/94 | |
| 2003/0051252 A1 | 3/2003 | Miyaoku et al. | |
| 2003/0229900 A1* | 12/2003 | Reisman ......................... 725/87 | |
| 2004/0088739 A1* | 5/2004 | Shimoji ............... H04N 5/4401 | 725/135 |
| 2004/0117254 A1* | 6/2004 | Nemirofsky et al. .......... 705/14 | |
| 2004/0117255 A1 | 6/2004 | Nemirofsky et al. | |
| 2005/0076219 A1 | 4/2005 | De Bot | |
| 2005/0080764 A1 | 4/2005 | Ito | |
| 2006/0195861 A1* | 8/2006 | Lee ................................ 725/19 | |
| 2006/0282864 A1* | 12/2006 | Gupte ................ H04N 7/17318 | 725/89 |
| 2007/0022442 A1 | 1/2007 | Gil et al. | |
| 2007/0299728 A1 | 12/2007 | Nemirofsky et al. | |
| 2008/0032719 A1* | 2/2008 | Rosenberg ............ G06Q 30/02 | 455/466 |
| 2008/0049704 A1* | 2/2008 | Witteman et al. ............ 370/342 | |
| 2008/0262928 A1 | 10/2008 | Michaelis | |
| 2010/0134278 A1 | 6/2010 | Srinivasan et al. | |
| 2011/0054993 A1* | 3/2011 | Marshall ................ G06Q 30/00 | 705/14.35 |
| 2011/0106605 A1* | 5/2011 | Malik .................... G06Q 30/02 | 705/14.23 |
| 2011/0150240 A1 | 6/2011 | Akiyama et al. | |
| 2011/0246284 A1* | 10/2011 | Chaikin et al. ............ 705/14.38 | |
| 2011/0314491 A1 | 12/2011 | Delidais et al. | |
| 2011/0314995 A1* | 12/2011 | Lyon et al. ..................... 84/609 | |
| 2012/0005062 A1* | 1/2012 | Lutnick .................. G06Q 40/04 | 705/37 |
| 2012/0221389 A1* | 8/2012 | Sharma et al. ............ 705/14.17 | |
| 2013/0024897 A1* | 1/2013 | Eyer .................... H04N 21/433 | 725/50 |
| 2013/0127636 A1* | 5/2013 | Aryanpur ............... G08C 19/00 | 340/870.07 |
| 2013/0279300 A1 | 10/2013 | Iwase et al. | |
| 2015/0356620 A1 | 12/2015 | Gil et al. | |

FOREIGN PATENT DOCUMENTS

| | | |
|---|---|---|
| EP | 2 189 915 A1 | 5/2010 |
| EP | 2 200 199 A1 | 6/2010 |
| JP | 11-110319 A | 4/1999 |
| JP | 11-119974 A | 4/1999 |
| JP | 2003-052072 A | 2/2003 |
| JP | 2005-122321 A | 5/2005 |
| JP | 2007-013925 A | 1/2007 |
| JP | 2007116719 A | 5/2007 |
| JP | 2008-258898 A | 10/2008 |
| JP | 2008-288638 A | 11/2008 |
| JP | 2012155706 A | 8/2012 |
| WO | 2004/008276 A2 | 1/2004 |
| WO | 2010/016589 A1 | 2/2010 |

OTHER PUBLICATIONS

International Search Report issued in PCT/JP2012/058259 dated Apr. 24, 2012.
Extended European Search Report, dated Jul. 22, 2014, issued in corresponding European Patent Application No. 12 76 7600.
Notice of Submission of Opinion, dated Jun. 26, 2014, issued by the Korean Intellectual Property Office in corresponding Korean Patent Application No. 10-2013-7026194. Please note, reference cited in OA were previously cited in an IDS filed Oct. 4, 2013. English Translation provided.
Notice of Submission of Opinion, issued by the Korean Intellectual Property Office in Application No. 10-2013-7026194 dated Jan. 27, 2015. English translation provided. References cited in OA have been previously cited in an IDS filed Feb. 13, 2015.
Japanese Office Action issued in corresponding Japanese patent application No. JP2012-084062, dated Aug. 18, 2015. English translation provided.
Office Action issued in CN Appln. No. 201280017523.6 mailed Mar. 28, 2016. English translation provided.
Office Action issued in Chinese Appln. No. 201280017523.6, mailed Sep. 14, 2016. English translation provided.
Written Opinion issued in Intl. Appln. No. PCT/JP2012/058259 dated Apr. 24, 2012. English translation provided.

* cited by examiner

| ID CODE | PROGRAM NAME | CONTENT TYPE | VALID TIME ZONE | CONTENT URL |
|---|---|---|---|---|
| 0000 | PROGRAM A | COUPON | 11:00-12:00 | URL OF CONTENT 1 |
| 0001 | PROGRAM B | PRIVILEGE IMAGE | 13:00-13:30 | URL OF IMAGE 2 |
| 0002 | PROGRAM C | COUPON | 14:00-15:00 | URL OF CONTENT 3 |
| 0003 | PROGRAM D | PRIVILEGE IMAGE | 15:00-16:30 | URL OF IMAGE 4 |

FIG.3A

| ID CODE | PROGRAM NAME | CONTENT TYPE | VALID TIME DIFFERENCE | CONTENT URL |
|---|---|---|---|---|
| 0000 | PROGRAM A | COUPON | A | URL OF CONTENT 1 |
| 0001 | PROGRAM B | PRIVILEGE IMAGE | B | URL OF IMAGE 2 |
| 0002 | PROGRAM C | COUPON | C | URL OF CONTENT 3 |
| 0003 | PROGRAM D | PRIVILEGE IMAGE | D | URL OF IMAGE 4 |

(A) (B) (C)

//www.w3.org/1999/xhtml">

INFORMATION PROVIDING SYSTEM, IDENTIFICATION INFORMATION RESOLUTION SERVER AND MOBILE TERMINAL DEVICE

This application is a U. S. National Phase Application of PCT International Application PCT/JP2012/058259 filed on Mar. 28, 2012, which is based on and claims priority from JP 2011-083976 filed on Apr. 5, 2011, the contents of which is incorporated in its entirety by reference.

TECHNICAL FIELD

The present invention relates to an information providing system that provides a variety of information by using sound identification information and an identification information resolution server and a mobile terminal device that are used in the system.

BACKGROUND ART

Regarding television broadcasting, a system has been commercialized which superimposes data broadcasting during program broadcasting and provides a variety of information relating to the program by a remote control operation of a television.

Also, in order to increase a real time viewer rate of the television program, a program progressing model has been widely used which presents one or more keywords in the program, calls a viewer at the end of the program and provides an award if the viewer speaks the keywords.

CITATION LIST

Patent Literature

Patent Literature 1: JP-A-2008-288638

SUMMARY OF INVENTION

Technical Problem

Instead of the keyword presentation, a scheme is considered in which the data broadcasting is used as means for increasing the viewer rate of the television program. However, since the data broadcasting cannot cope with an individual access of a viewer, it is necessary to receive an access of a viewer by separate means so as to provide an award. Also, even when an award content such as coupon is displayed on a screen of a television receiver, the viewer cannot carry and utilize the displayed award content. In addition to the television broadcasting, there are also many demands for inducing a user to a media including radio broadcasting and web site, a store and the like.

An object of the present invention is to provide an information providing system capable of providing a mobile terminal device, which is used by a user, with information by using sound identification information to thus induce the user to a media, a store and the like in real time, and also to provide an identification information resolution server and a mobile terminal device, which are used in the system.

Solution to Problem

A first aspect includes an information providing system including: a sound emission device, adapted to emit, as a sound wave, identification information modulated to a sound signal; an identification information resolution server that is connected to an information communication network and includes a mapping table in which the identification information, valid time information, which indicates a range of valid time of the identification information, and address information of a content corresponding to the identification information are stored to be associated with each other; and a mobile terminal device that includes a sound pickup unit, adapted to pick up the sound wave emitted from the sound emission device, a demodulation unit, adapted to demodulate the identification information from the picked up sound wave, an identification information resolution unit, adapted to transmit the demodulated identification information to the identification information resolution server and thus acquire the address information, and a network access unit, adapted to access the content by using the acquired address information, wherein the identification information resolution server receives the identification information from the mobile terminal device, refers to the mapping table by using time information and the identification information and returns the address information of a corresponding content to the mobile terminal device when the time information is within the range of valid time indicated by the valid time information.

A second aspect includes the feature that the sound emission device is a broadcasting receiving device, the sound wave is transmitted from a broadcasting station, as a sound wave in a broadcasting program or promo, and the identification information resolution server identifies address information for accessing a content relating to the program or promo, based on the received identification information.

A third aspect includes the feature that the time information indicates at least one of time at which the identification information resolution server receives the identification information, time at which the sound pickup unit of the mobile terminal device picks up the sound wave, time at which the demodulation unit of the mobile terminal device demodulates the identification information and time at which the identification information resolution unit of the mobile terminal device transmits the identification information to the identification information resolution server.

An identification information resolution server of a fourth aspect includes: a reception unit, adapted to receive identification information through an information communication network from a mobile terminal device that is adapted to pick up a sound wave including the identification information and demodulate the identification information from the sound wave, the identification information being modulated to a sound signal; a storage unit storing therein a mapping table in which the identification information, valid time information, which indicates a range of valid time of the identification information, and address information of a content corresponding to the identification information are stored to be associated with each other; and an identification information resolution section, adapted to refer to the mapping table by using time information and the identification information received by the reception unit and return the address information of a corresponding content to the mobile terminal device when the time information is within the range of valid time indicated by the valid time information.

A fifth aspect includes an information providing system including: a sound emission device, adapted to emit, as a sound wave, identification information modulated to a sound signal; an identification information resolution server that is connected to an information communication network and includes a mapping table in which the identification information and address information of a content corresponding to the identification information are stored to be associated with each other; and a mobile terminal device that includes a sound pickup unit, adapted to pick up the sound wave emitted from the sound emission device, a demodulation unit, adapted to demodulate the identification information from the picked up sound wave, an identification information resolution unit, adapted to transmit the demodulated identification information to the identification information resolution server and thus acquire the address information, and a network access unit, adapted to access the content by using the acquired address information, wherein the demodulation unit of the mobile terminal device further extracts time information from the picked up sound wave or the demodulated identification information, and the identification information resolution unit of the mobile terminal device determines whether the identification information is valid or not based on the extracted time information, and transmits the identification information to the identification information resolution server when it is determined that the identification information is valid.

A mobile terminal device of a sixth aspect includes: a sound pickup unit, adapted to pick up a sound wave emitted from a sound emission device; a demodulation unit, adapted to demodulate identification information from the picked up sound wave; an identification information resolution unit, adapted to transmit the demodulated identification information to an identification information resolution server and thus acquire address information; and a network access unit, adapted to access a content corresponding to the identification information by using the acquired address information, wherein the demodulation unit further extracts time information from the picked up sound wave or the demodulated identification information, and the identification information resolution unit determines whether the identification information is valid or not based on the extracted time information, and transmits the identification information to the identification information resolution server when it is determined that the identification information is valid.

Advantageous Effects of Invention

According to the aspects of the present invention, the valid time is set for the identification information superimposed on the sound, and the address information of the content is provided to the mobile terminal device when the time information is within the range of the valid time. Therefore, it is possible to induce a user of the mobile terminal device to a media such as a television program, a radio program and a web site or to a store in real time.

BRIEF DESCRIPTION OF DRAWINGS

FIG. 3A is similar to FIG. 3, but includes a valid time difference instead of a valid time zone.

DESCRIPTION OF EMBODIMENTS

Figure 1:
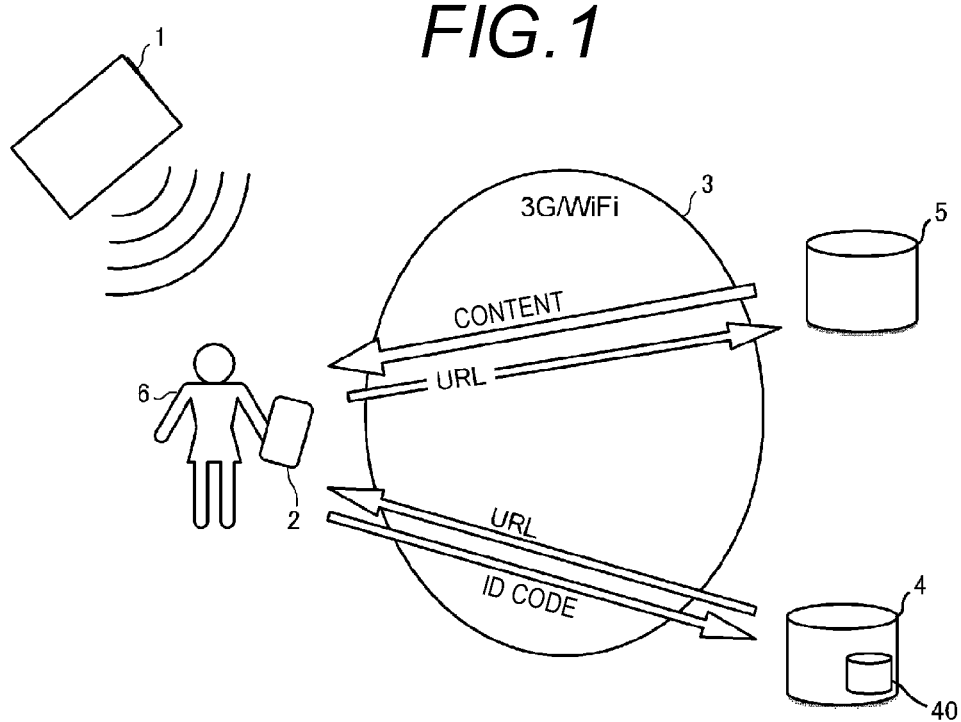
FIG. 1 is a block diagram of an information providing system according to an embodiment of the present invention.

An information providing system according to an embodiment of the present invention will be described with reference to the drawings. FIG. 1 illustrates a configuration of the information providing system. The information providing system is a system that superimposes a sound ID (identification information) on a broadcasting program of a television (TV; a sound emission device) and enables a mobile terminal device 2 to access a specific internet site (URL) and thus to acquire a coupon or the like beneficial to a user 6 (viewer), thereby improving a real time viewer rate of the program. A smart phone or the like is used as the mobile terminal device 2.

First, the information providing system is outlined. The television 1 emits a broadcasting sound and a sound ID while a predetermined television program (including a CM) is being telecast. The sound ID is emitted with being superimposed on the broadcasting sound. In the meantime, the sound ID may be superimposed by the television 1, a broadcasting station or a relay device. The emitted sound ID is picked up by the mobile terminal device 2. The mobile terminal device 2 demodulates the sound ID to an ID code and accesses a specific internet site (URL) by using the ID code. By doing so, specific information such as coupon or the like is transmitted from the internet site to the mobile terminal device 2. Like this, since the user 6 (viewer) of the mobile terminal device 2 can acquire the content such as coupon or the like by watching the predetermined television program, the user intends to watch the television program. Thereby, it is possible to improve the viewer rate of the television program.

The system has a main object of improving the viewer rate during the broadcasting of the television program. Thus, even when the internet site is accessed after the broadcasting of the program by using a sound ID, which is emitted when the user 6 reproduces a program video-recorded in a storage medium such as a hard disk drive, an optical disk and the like in home, the system determines that the access time to the Internet site is not within a predetermined valid time one designated by the television broadcasting, and cannot provide the content.

Figures 3, 4:
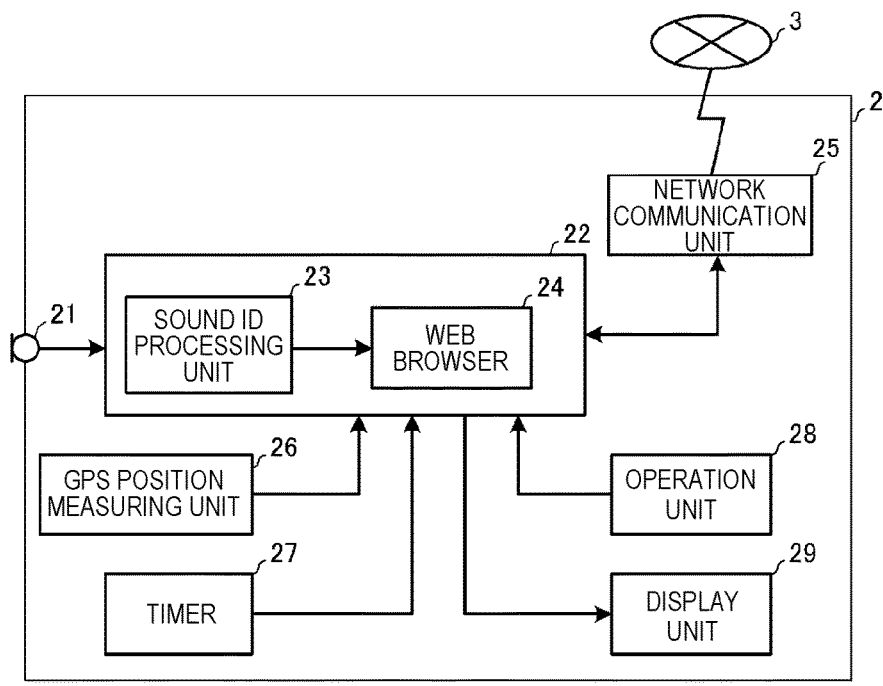
FIG. 3 shows an example of an ID/URL mapping table of an ID resolution server.
FIG. 4 is a partial block diagram of a mobile terminal device.
Figure 6:
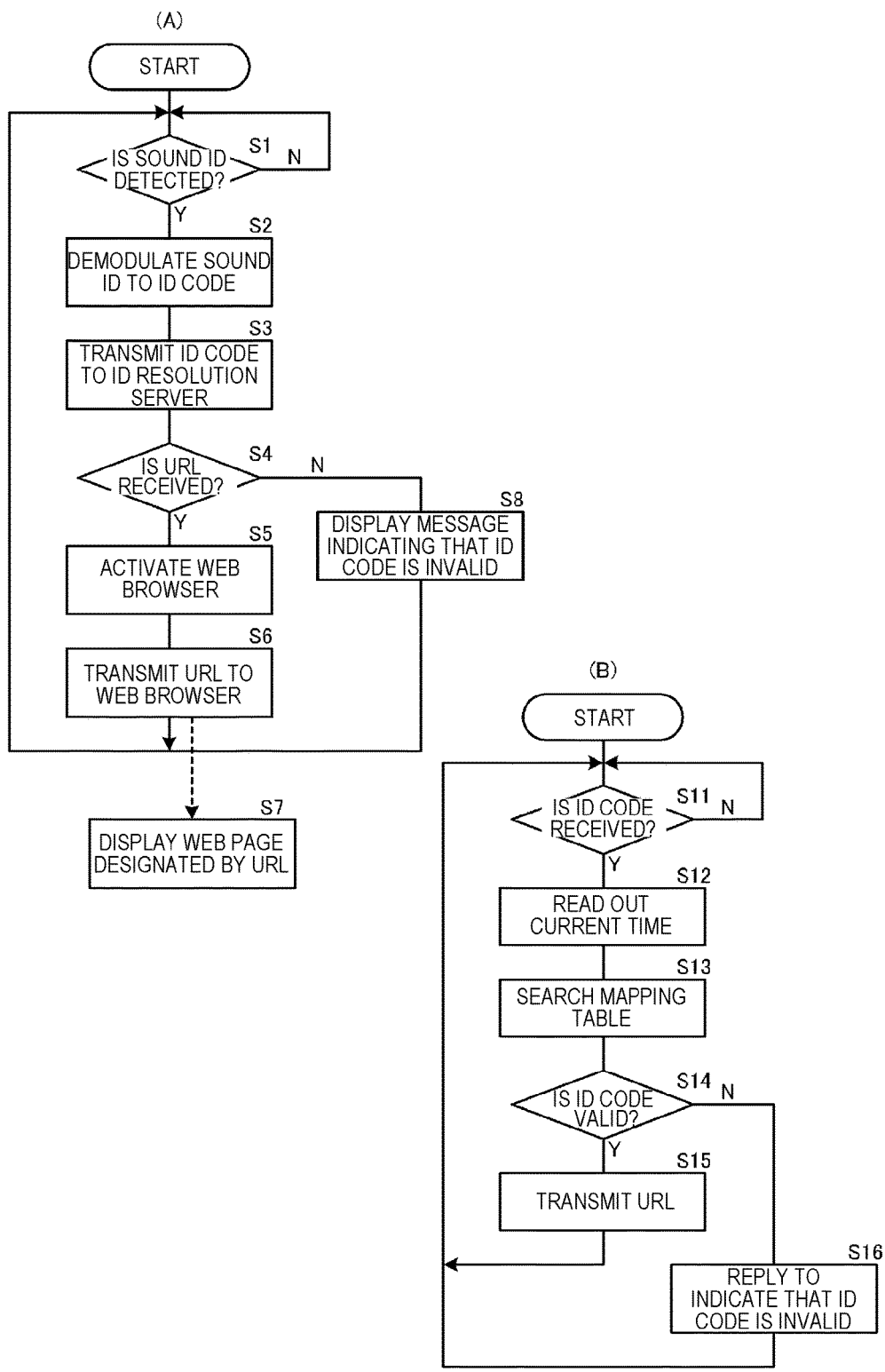
FIG. 6 is a flowchart showing operations of the mobile terminal device and the ID resolution server.

The television 1 is an example of a broadcasting receiving device that receives television broadcasting, displays an image and emits a sound. The sound ID that is an ID code modulated to a sound signal is superimposed on the sound of the television broadcasting. The sound ID may be superimposed one time upon opening part of the television broadcasting or may be superimposed several times at appropriate timing. Also, the sound ID may be repeatedly superimposed over an entire time zone of the television broadcasting. The superimposing method of the sound ID will be described later. The mobile terminal device 2 picks up the sound on which the sound ID is superimposed. The user 6 carries the mobile terminal device 2. The mobile terminal device 2 is installed with a sound ID application program that is executed by a control unit 22, which will be described later. The sound ID application program is application software that separates the sound ID from the picked up sound to thus demodulate the same to an ID code and transmits the ID code to an ID resolution server 4, thereby acquiring a URL of a content server 5 from the ID resolution server 4. As shown in FIG. 4, the mobile terminal device 2 includes the control unit 22. The control unit 22 has a sound ID processing unit 23. The control unit 22 executes the sound ID application program to thereby implement the sound ID processing unit 23. A detailed operation of the sound ID processing unit 23 will be described with reference to a flowchart of FIG. 6. The mobile terminal device 2 demodulates the sound ID included in the sound to an ID code by the sound ID processing unit 23 and transmits the ID code to the ID resolution server 4 through a network 3. The ID resolution server 4 has an ID/URL mapping table 40, searches the ID/URL mapping table 40 by using the received sound ID to thus read out a corresponding URL and returns the same to the mobile terminal device 2.

Figure 2:
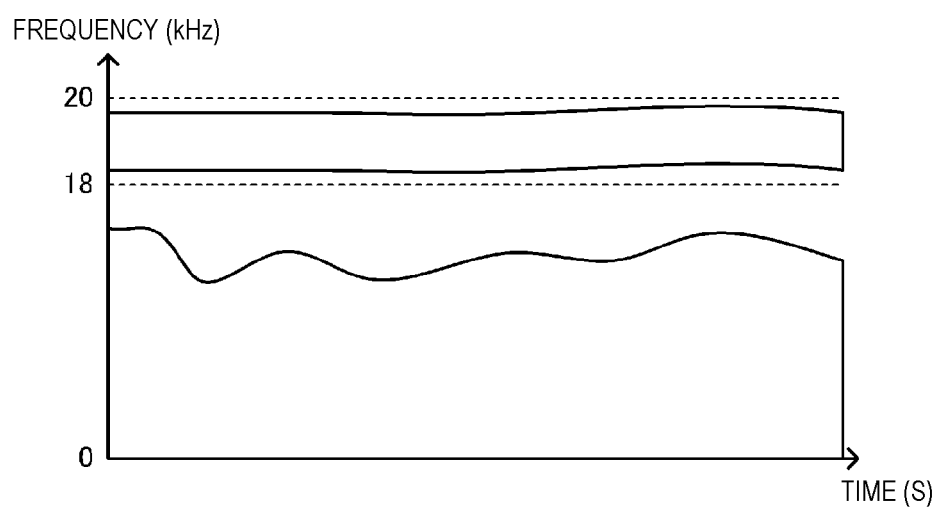
FIG. 2 shows an example of a superimposition method of a sound ID.

The sound ID is superimposed on a frequency band of a high-tone range of an audible sound that is reproduced by a speaker of the television 1. As shown in FIG. 2, a frequency of a content sound that is being telecast in a program or CM of the television broadcasting has generally an upper limit of about 16 kHz. The frequency band of a high-tone range on which the sound ID is superimposed is a frequency band that is the upper limit frequency or higher and can be reproduced by an operation of an audio circuit or speaker of the television 1, for example a band of 18 to 20 kHz.

Regarding the method of superimposing the sound ID on the sound of the program or CM, a variety of methods can be adopted. For example, a technology is suitable which is specifically described in WO 2010/016589 and spreads an ID code with a spread code to thus frequency-shift the same to a frequency band of 18 to 20 kHz.

In order to resolve the sound ID to a URL, the ID resolution server 4 is provided with the ID/URL mapping table 40 shown in FIG. 3. In this specification, the description that the 'sound ID is resolved to a URL' means that a URL (address information) corresponding to an ID code obtained by demodulating a sound ID is specified. In the ID/URL mapping table 40, a plurality of ID codes, and program names, contents types to be provided (a coupon, a privilege image and the like), valid time zones (valid time information) and URLs of contents that correspond to the ID codes are stored to be associated with each other. Like this, a URL of a content is associated with an ID code (for example, a four-digit number, refer to FIG. 3) having a data length shorter than the URL, so that it is possible to provide a URL (a predetermined character string such as alphanumeric characters) having a data length longer than the ID code to the mobile terminal device 2 of the user even when the provision is data transmission by sound having a transmission rate that is not high.

Also, in the ID/URL mapping table 40 of FIG. 3, the valid time zone of the same ID code may be further subdivided and different contents may be respectively provided in the respective subdivided valid time zones. For example, even a time zone corresponding to the same program A may be subdivided into (1) an opening time period of a program (for example, 11:00 to 11:05), (2) a broadcasting time period of a specific content of the program (for example, 11:35 to 11:45), (3) an end time period of the program (for example, 11:55 to 12:00) and (4) the other program time period (for example, a time period except for the time periods of 11:00 to 12:00). A high quality service is associated with an access at a time zone at which the watching is required, so that improvement of the television program watching may be expected.

FIG. 4 is a function block diagram showing extracted parts of the mobile terminal device 2 relating to this embodiment. The mobile terminal device 2 has a microphone 21, a control unit 22, a network communication unit 25, a GPS position measuring unit 26, a timer 27, an operation unit 28 and a display unit 29. The microphone 21 picks up sound emitted from a speaker of the television 1. The network communication unit 25 is a function block that performs communication with the ID resolution server 4 or content server 5 through the network 3.

The control unit 22 is configured by a processing means such as a CPU and the like and a storage means such as a RAM and the like storing various programs and data. The CPU and the like execute the various programs, so that the control unit 22 is implemented. The control unit 22 is provided with the sound ID processing unit 23 and a web browser 24. The control unit 22 executes a sound ID application program, so that the sound ID processing unit 23 is implemented. Also, the control unit 22 executes a browser program, which is a standard application program of the mobile terminal device 2, so that the web browser 24 is implemented. The sound ID processing unit 23 has a processing unit that enables a picked-up sound signal to pass through a matched filter, which has a spread code used in spread modulation as a coefficient, and thus demodulates an ID code, a processing unit that controls the network communication unit 25 and performs communication with the ID resolution server 4 and the content server 5, and the like. The demodulation processing of the ID code is specifically described in WO 2010/016589. The web browser 24 accesses the URL acquired by the sound ID processing unit 23 and thus displays a web page.

The GPS position measuring unit 26 measures a position thereof by using a GPS and provides the position information or time information to the web browser 24. Also, the timer 27 measures time upon the pickup of a sound including the sound ID or upon communication with the ID resolution server 4 and provides the time information to the web browser 24. The GPS position measuring unit 26 and the timer 27 are not necessarily provided in this embodiment. Also, the operation unit 28 is a touch panel that is provided on a surface of the display unit 29, for example, and detects an operation of the user 6 such as permission of the communication with the network 3.

Figure 5:
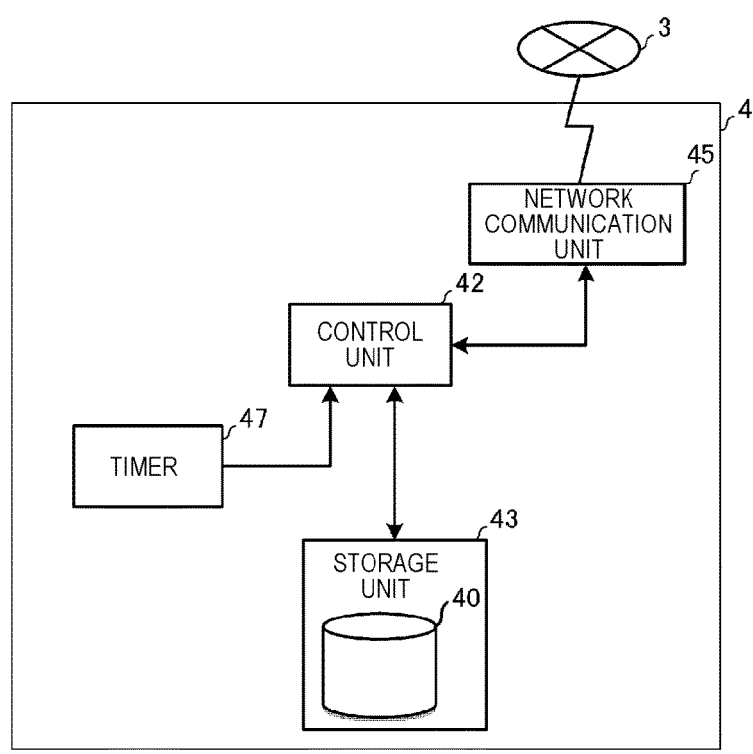
FIG. 5 is a partial block diagram of the ID resolution server.

FIG. 5 is a function block diagram showing extracted parts of the ID resolution server 4, which is a computer apparatus, relating to this embodiment. The ID resolution server 4 has a control unit 42, a storage unit 43, a network communication unit 45 and a timer 47. In the storage unit 43, the ID/URL mapping table 40 and a program for executing a processing sequence, which will be described with reference to (B) of FIG. 6 and the like, are stored. The network communication unit 45 is a function block that transmits and receives a message, data and the like to and from the mobile terminal device 2, which is a client, through the network 3.

The control unit 42 is connected to the storage unit 43 and the timer 47. The control unit 42 is a processing unit (an identification information resolution unit) (which will be specifically described later) that executes ID resolution processing of resolving an ID code, which is received through the network communication unit 45, to a URL while referring to the ID/URL mapping table 40 stored in the storage unit 43 and the timer 47.

The content server 5 is a computer apparatus having a storage unit that stores a variety of data configuring contents such as advertisement/coupon or the like corresponding to the URL resolved by the ID resolution server 4, a communication unit that transmits and receives a message, data and the like to and from the mobile terminal device 2, which is a client, and a control unit for implementing a function such as a web server that provides the information such as advertisement/coupon or the like, as a response corresponding to a request from the mobile terminal device 2. In the meantime, the configuration of the computer apparatus configuring the ID resolution server 4 and the content server 4 is arbitrary and may be implemented in one computer apparatus or a plurality of computer apparatuses. Alternatively, the configuration may be implemented on a virtual server that is provided through a network, not the actual computer apparatus.

FIG. 6(A) is a flowchart showing an operation of the sound ID processing unit 23 of the mobile terminal device 2 and FIG. 6(B) is a flowchart showing an operation of the control unit 42 of the ID resolution server 4. First, in FIG. 6(A), the sound ID processing unit 23 of the mobile terminal device 2 is on standby at a step S1 (hereinafter, a step Sn is simply referred to as Sn) while it does not detect a sound ID. When the sound ID processing unit 23 detects a sound ID (YES in S1), it demodulates the sound ID (S2) and transmits the demodulated ID code to the ID resolution server 4 (S3). The ID resolution server 4 executes the processing of FIG. 6(B) in correspondence to the received ID code and replies to indicate that a corresponding URL or ID code is invalid to the mobile terminal device 2. When the mobile terminal device 2 receives the reply, the sound ID processing unit 23 determines whether the reply is a telegram message indicating that a content thereof is URL or invalid (S4). When it is determined in S4 that the reply is a URL, the sound ID processing unit 23 activates (including calling the web browser 24 at the standby state or background) the web browser 24 by a browser program that is a standard application program of the mobile terminal device 2 (S5), transmits the received URL to the web browser 24 (S6) and accesses the URL and displays a web page on the web browser 24 (S7). Also, when it is determined in S4 that the reply is invalid, the mobile terminal device 2 displays a message indicating that the ID code is invalid (S8).

In the meantime, the ID resolution server 4 executes following authentication processing to thereby specify the mobile terminal device 2. That is, the mobile terminal device 2 transmits a unique identification code of the mobile terminal device 2 to the ID resolution server 4 and executes predetermined processing to thus complete the authentication processing. Also, the authentication processing is preferably executed up to S3 of FIG. 6(A). Alternatively, the authentication processing may be executed simultaneously with S3. In this case, the mobile terminal device transmits a unique identification code of the mobile terminal device 2 and the ID code to the ID resolution server 4 at the same time.

In the meantime, when the content is data of a format that does not require the web browser 24, the sound ID processing unit 23 activates a necessary application program without activating the web browser 24, thereby displaying or reproducing the content.

Also, in order to prevent a plurality of accesses to the ID resolution server 4, the sound ID processing unit 23 of the mobile terminal device 2 or other processing unit provided to the control unit 22 may determine whether the ID code demodulated in S2 is the same ID code demodulated in past predetermined time. When the same ID code is identified, the sound ID processing unit 23 may not execute the transmission to the ID resolution server 4 in S3. Thereby, it is possible to prevent the ID code associated with the same program or scene from being uselessly transmitted several times from one mobile terminal device 2 to the ID resolution server 4.

In the flowchart of FIG. 6(A), the sound ID is detected and demodulated to the ID code and then the ID resolution server 4 is automatically accessed. However, after the demodulation of the ID code, the mobile terminal device may wait for a predetermined operation of the user 6 and then access the ID resolution server 4. In this case, the mobile terminal device may stand by until the user 6 makes an operation before S3.

When the mobile terminal device 2 waits for an operation of the user 6 and then accesses the ID resolution server 4, a message indicating that the mobile terminal device 2 receives the sound ID may be displayed or announced or the television 1 may instruct the user 6 to perform the transmission operation of the mobile terminal device 2 at appropriate timing after the sound ID is superimposed in the television program. In this case, the television 1 may instruct that the transmission operation should be made in conformity with a specific scene (for example, a scene at which an actor A shows up) that a user cannot know when it will be telecast. In the meantime, instead of the television 1, the mobile terminal device 2 or other instruction means may be used to instruct the user 6 to perform the transmission operation.

When predetermined time elapses after the sound ID is emitted, a message urging the user to operate the mobile terminal device 2 is displayed or announced in the television program, so that only the user 6 (the mobile terminal device 2) watching the TV from the emission of the sound ID to the display or announcement of the message may be enabled to access the ID resolution server 4. Also, after the sound ID is emitted, when the transmission operation is instructed in conformity to a specific scene that a user cannot know when it will be telecast in the television program, it is possible to urge the user 6 to watch the program from the instruction to the specific scene. The valid time zone of the ID/URL mapping table 40 may be preferably constant time from the display or announcement or specific scene.

FIG. 6(B) is a flowchart showing an operation of the control unit 42 of the ID resolution server 4. The control unit 42 of the ID resolution server 4 stands by at S11 until it receives an ID code from the mobile terminal device 2. When the control unit 42 receives an ID code (YES in S11), the control unit 42 refers to the timer 47 to thereby read out time at that time (i.e., reception time) as the time information (S12) and searches (refers to) the ID/URL mapping table 40 by the reception time and the received ID code (S13). As a result of the search, when the reception time is included in the valid time zone of the received ID code (YES in S14), the control unit 42 determines that the ID code is valid, reads out a corresponding URL and transmits the ID code to the mobile terminal device 2 (S15). On the other hand, when the reception time is not included in the valid time zone (NO in S14), the control unit 42 determines that the ID code is transmitted at a time zone deviating from the valid time zone and replies to indicate that the ID code is invalid to the mobile terminal device 2 (S16).

By the above processing, while the ID resolution server 4 returns a URL of the content to the mobile terminal device 2 only when it is accessed immediately (or at predetermined timing) after the sound ID is telecast (emitted) in the television program, the ID resolution server 4 performs the invalidation processing for an access in a time zone deviating from the valid time zone after predetermined time elapses from the actual broadcasting, for example upon reproduction of a recorded content.

Meanwhile, in this embodiment, the ID resolution server 4 determines whether it is a valid time zone or not by using the time information that is the reception time at which the ID code is received from the mobile terminal device 2. However, the time that is used to determine the valid time period is not limited thereto. For example, time at which the mobile terminal device 2 picks up or demodulates the sound ID, time at which the mobile terminal device 2 transmits the ID code to the ID resolution server 4 or the like may be used. In this case, the time acquired by the GPS measuring unit 26 of the mobile terminal device 2 or time measured by the timer 27 is transmitted to the ID resolution server 4 together with the ID code, as the time information. Also, the plurality of time information may be used or combined to perform the determination.

When the determination is made using the plurality of time information, the ID code is preferably determined valid if all the plurality of time information is within the valid time zone of the ID/URL mapping table 40. Also, valid time zones about a plurality of time information may be respectively stored in the ID/URL mapping table 40, and when the plurality of time information is within the respective valid time zones, the received ID code may be determined valid.

Also, the ID resolution server 4 may determine whether the ID code is valid/invalid, based on a time difference of the plurality of time information. That is, when the ID code is transmitted to the ID resolution server 4 immediately (or in predetermined time) after the sound ID is received or after the sound ID is demodulated to the ID code, the ID code is determined valid. In this case, information of a valid time difference may be stored in the ID/URL mapping table 40, instead of the information of the valid time zones, as shown in FIG. 3A. The time differences can be: A=60 min; B=30 min; C=60 min; and D=90 min.

Also, the ID resolution server 4 may acquire the plurality of time information, perform the determination by one time information and determine a priority of the access by using the other time information. For example, the ID resolution server 4 determines whether the ID code is valid/invalid, based on the reception time, acquires time at which the ID code is demodulated from the mobile terminal device 2 and sets a priority of the access higher as a time difference from the demodulation time to the reception time is shorter. Regarding the access having a higher priority, a privilege that provides a URL providing a higher degree of content even though the ID code is the same may be given, for example.

Also, the time acquired by the GPS measuring unit 26 of the mobile terminal device 2 and the time measured by the timer 27 may be compared. Thereby, it is possible to obtain correct time information or to prevent incorrect time information from being acquired.

In the above embodiment, an example where the sound ID is superimposed on the sound of the television 1 to thereby improve the viewer rate of the television program has been described. However, the broadcasting is not limited to the television broadcasting. For example, when the present embodiment is applied to a radio broadcasting, it is possible to improve a listening rate of the radio broadcasting. Also, when the above embodiment is applied to the network delivery by the internet, it is possible to increase the number of accesses of a web site performing the network delivery.

Like this, an operator of a television or radio broadcasting station or a web site can induce the user of the mobile terminal device 2 to a media in real time. Also, it is possible to emit the sound ID from a speaker mounted in a facility such as a retail store and to provide a content such as coupon or the like, thereby inducing a customer (the user of the mobile terminal device 2) to the store in the valid time zone to thus improve a customer visit (visit rate) to the store. In this case, a valid time zone may be set, so that it is possible to prevent a sound, which is recorded by a customer who records the sound ID by a sound recorder and the like and brings back the recorded sound ID, from being reproduced to acquire a content in a time zone deviating from the valid time zone.

Figure 7:
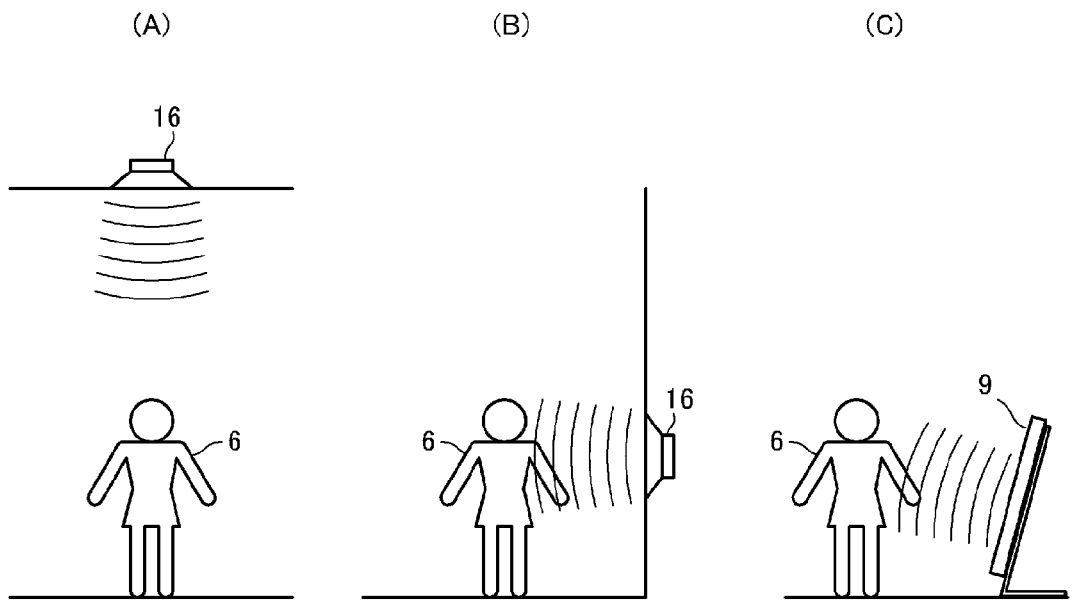
FIG. 7 shows examples of arrangement of a speaker for a case where the information providing system is applied to a store.

When the speaker is mounted in the retail store and the like, the speaker 16 may be mounted in the vicinity of the store or in the store, as shown in (A) to (C) of FIG. 7. FIG. 7(A) shows an aspect in which the speaker 16 is mounted on a passage or on a ceiling of the store. FIG. 7(B) shows an aspect in which the speaker 16 is mounted on a passage or on a wall of the store. Also, FIG. 7(C) shows an aspect in which a notice board 9 having the speaker 16 embedded therein is provided at the front of the store. However, the mounting aspects of the speaker 16 are not limited thereto. For example, the speaker 16 may be a device that emits sound in correspondence to provision of a service. In this case, since the sound has generally a short arrival distance, contrary to a radio wave, the sound ID is received only in the vicinity of the store in which the speaker 16 is mounted. Thereby, the coupon or information may be provided to only an object person in a relatively narrow area that can be checked with eyes, such as a customer having just passed to the store or a customer in the store.

Figure 8:
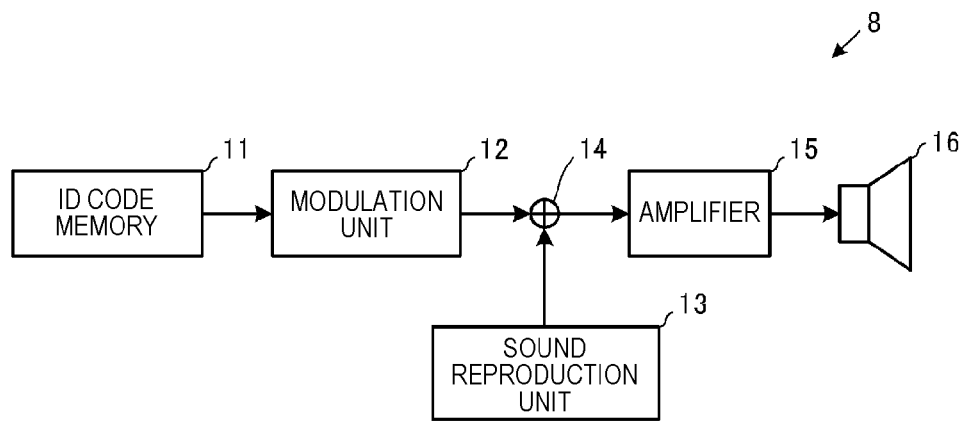
FIG. 8 is a block diagram showing a configuration example of a sound emission device.

FIG. 8 is a block diagram showing a configuration of a sound emission device 8 having the speaker 16 that is mounted in FIG. 7. The sound emission device 8 has an ID code memory 11, a modulation unit 12, a sound reproduction unit 13, a combining unit 14, an amplifier 15 and the speaker 16. In the ID code memory 11, an ID code associated with a predetermined content (URL, coupon) is spread in advance with a spread code and is stored as a sound ID. The modulation unit 12 is a processing unit that modulates the ID code to a signal in a frequency band that can be emitted as a sound wave, which is a vibration of a medium such as air or solid. Regarding a modulating mode of the modulation unit 12, a variety of methods can be used. However, in this embodiment, in order to improve noise resistance, a spread code is phase-modulated with the ID code and the phase-modulated spread code is frequency-shifted to an inaudible band and emitted. This technology is specifically described in WO 2010/016589. The sound reproduction unit 13 is a function unit that reproduces a sound announcing a name of a store and the like and a music such as CM song, and outputs a touting sound such as sounds and music. The combining unit 14 is a function unit that additively combines the sound ID (spread-modulated ID code) and the touting sound. The amplifier 15 amplifies the sound input from the combining unit 14 to appropriate power and then supplies the same to the speaker 16. The speaker 16 emits the sound signal input from the amplifier 15, as a sound. Here, the output power of the amplifier 15 is power with which the sound (sound wave) reaches a coverage area of the sound emission device 8 and does not reach beyond the coverage area, and may be appropriately set depending on an area of a mounting place and a degree of noise.

Meanwhile, in this embodiment, an exciter and a vibration pickup may be respectively used instead of the speaker 16 emitting the modulated signal and the microphone 21 picking up the signal. That is, the modulated signal may be transmitted by solid vibration, instead of the air vibration.

In the above embodiment, the smart phone has been exemplified as the mobile terminal device 2. However, the mobile terminal device 2 is not limited to the smart phone, and may be also a mobile phone, a PDA (Personal Digital Assistant) and the other device.

In the above embodiment, the ID resolution server 4 may return the URL when a plurality of accesses is tried from the mobile terminal device 2. For example, when ID codes are respectively attached to a plurality of scenes in the television program and all ID codes corresponding to the respective scenes are received from the mobile terminal device 2, when ID codes are respectively associated with the same program every day or every week and all the ID codes corresponding to the programs of respective episodes are received from the mobile terminal device 2, when an ID code emitted from a signage of a store is received several times, and the lie, the ID resolution server may return a URL to the mobile terminal device 2. In this case, the ID resolution server 4 may preferably store information of the identification code and the number of access times of the mobile terminal device 2 for a predetermined time period from the latest access.

In the above embodiment, the time information is not given to the sound ID and the ID resolution server 4 receiving the ID code from the mobile terminal device 2 determines whether the ID code is valid or invalid, based on the reception time. The time information may be added to the sound ID by other methods. By doing so, the mobile terminal device 2 may determine whether the sound ID (ID code) is valid or not, based on the time information read out from the received sound ID. That is, the sound ID that is emitted when reproducing the recorded program is determined invalid by the mobile terminal device 2 having received the sound ID because the time information included in the sound ID and the current time are largely different. Thereby, when the ID code is invalid, since the mobile terminal device 2 can destroy the ID code, the ID resolution server 4 does not transmit all the ID codes to the mobile terminal device 2, so that it is possible to reduce load of the ID resolution server 4. The time information may be a part of the ID code, and the ID code and the time information may be integrally modulated as the sound ID although the ID code and the time information are different information. Also, the time information may be encrypted.

Figure 9:
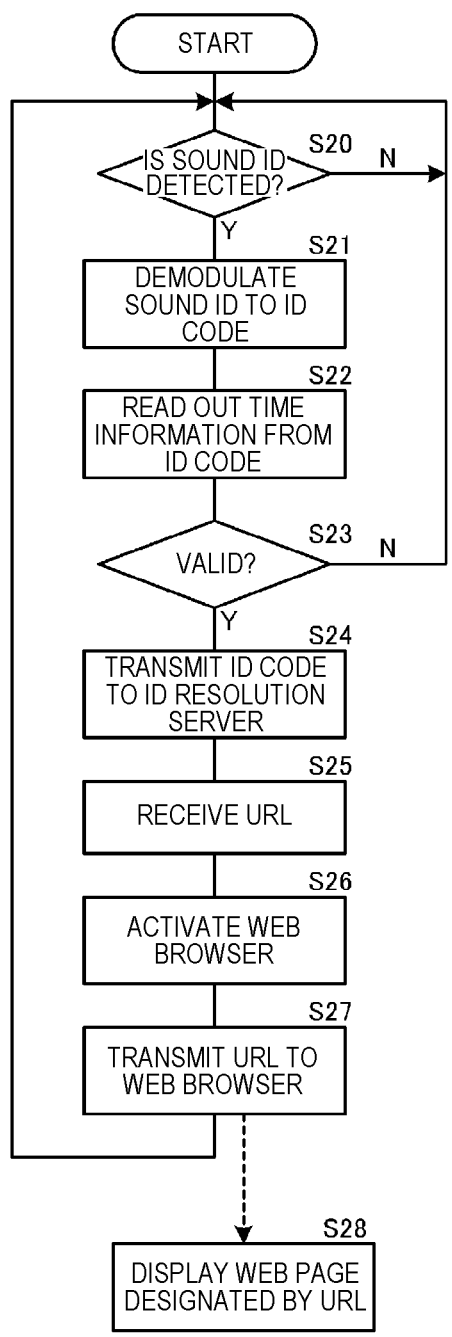
FIG. 9 is a flowchart showing an operation of the mobile terminal device.

FIG. 9 is a flowchart showing an operation of the sound ID processing unit 23 of the mobile terminal device 2 for a case where the time information is added to the sound ID. The sound ID processing unit 23 of the mobile terminal device 2 stands by at S20 while it does not detect a sound ID. When the sound ID processing unit 23 detects a sound ID (YES in S20), it demodulates the detected sound ID to an ID code (S21) and reads out time information that is included in the demodulated ID code or is demodulated together with the ID code (S22). Then, the sound ID processing unit 23 determines whether the time information is valid or not, i.e., whether the time information is within a predetermined time period (for example, within 30 minutes) from current time read out from the timer 27 (S23). When the ID code is valid, the sound ID processing unit 23 transmits the ID code to the ID resolution server 4 (S24). The ID resolution server 4 returns a URL corresponding to the received ID code to the mobile terminal device 2. In the meantime, since the mobile terminal device 2 determines the validity of the ID code, the ID resolution server 4 does not determine the validity of the received ID code. When the mobile terminal device 2 receives the reply (S25), the sound ID processing unit 23 activates (which includes calling the web browser 24 at the standby state or from background) the web browser 24 that is the standard application of the mobile terminal device 2 (S26), transmits the received URL to the web browser 24 (S27) and enables the web browser 24 to access the URL and to thus display a web page (S28). In the meantime, when the content is data of a format that does not require the web browser 24, the sound ID processing unit 23 may activate a necessary application program without activating the web browser 24, thereby displaying or reproducing the content.

Also, as a method other than the above method, the ID resolution server 4 may receive the accesses from the mobile terminal device 2 in order of arrival and return URLs of contents for a predetermined number of accesses transmitting the ID codes. In this case, the valid time information of the ID/URL mapping table 40 may be omitted.

As described above, in the respective embodiments, the sound ID processing unit 23 of the mobile terminal device 2 is a function unit that executes the sound ID application program in the control unit 22, and the sound ID application program can be provided with being recorded in a computer-readable recording medium. The computer-readable recording medium may include a magnetic recording medium (a magnetic tape, a magnetic disk (HDD, FD) and the like), an optical recording medium (an optical disk (CD, DVD) and the like), an optical magnetic recording medium, a semi-conductor memory and the like. Also, the program may be downloaded via an information communication network such as the Internet.

In the meantime, the ID code may be added to the broadcasting program by a method, other than the sound ID. For example, a sub code of a sound signal or data broadcasting may be also used. However, according to the method of using the sound ID, since it is not necessary to provide a new function to the television receiver 1, the method may be applied to an existing television receiver. Also, even when the sound ID is used, the sound signal may be emitted, as the sound (sound wave), from the speaker and picked up by the mobile terminal device 2 and may be also transmitted by a wired or wireless transmission system such as audio cable or Bluetooth (registered trademark).

The present application is based on Japanese Patent Application No. 2011-083976 filed on Apr. 5, 2011, the contents of which are incorporated herein by reference.

REFERENCE SIGNS LIST

1: television (sound emission device)
2: mobile terminal device
3: network
4: ID resolution server
5: content server
6: customer
8: sound emission device
16: speaker
24: sound ID processing unit
40: ID/URL mapping table

The invention claimed is:
1. An information providing system comprising:
a sound emission device adapted to emit, as a sound wave, identification information modulated to a sound signal;
an identification information resolution server that is connected to an information communication network and includes a mapping table storing the identification information, valid time difference information, which indicates a range of valid time of the identification information, and address information of a content corresponding to the identification information in association with each other; and a mobile terminal device that includes a sound pickup unit adapted to pick up the sound wave emitted from the sound emission device, a demodulation unit adapted to demodulate the identification information from the picked up sound wave, an identification information resolution unit adapted to transmit the demodulated identification information to the identification information resolution server and thus acquire the address information, and a network access unit adapted to access the content using the acquired address information, wherein the identification information resolution server receives the identification information from the mobile terminal device, refers to the mapping table using a time difference and the identification information, and returns the address information of a corresponding content to the mobile terminal device when the time difference is within the range of valid time indicated by the valid time difference information contained in the mapping table, and wherein the time difference is between when the mobile terminal either received the sound wave emitted from the sound emission device or demodulated the identification information after receiving the sound wave, and when the mobile terminal transmits the identification information to the identification information resolution server.

2. The information providing system according to claim 1, wherein:

the sound emission device is a broadcasting receiving device, the sound wave is transmitted from a broadcasting station, as a sound wave in a broadcasting program or promo, and the identification information resolution server identifies address information for accessing a content relating to the program or promo, based on the received identification information.

3. An identification information resolution server comprising:

a reception unit adapted to receive identification information through an information communication network from a mobile terminal device that is adapted to pick up a sound wave including the identification information and demodulate the identification information from the sound wave, the identification information being modulated to a sound signal;

a storage unit storing therein a mapping table in which the identification information, valid time difference information, which indicates a range of valid time of the identification information, and address information of a content corresponding to the identification information in association with each other; and an identification information resolution section adapted to refer to the mapping table using a time difference and the identification information received by the reception unit, and return the address information of a corresponding content to the mobile terminal device when the time difference is within the range of valid time indicated by the valid time difference information, wherein the time difference is between when the mobile terminal either received the sound wave emitted from the sound emission device or demodulated the identification information after receiving the sound wave, and when the mobile terminal transmits the identification information to the identification information resolution server.

4. The information providing system according to claim 1, wherein the identification information resolution server replies to the mobile terminal device indicating that the identification information is invalid when the time difference is out of the range of valid time indicated by the valid time information.

5. The identification information resolution server according to claim 3, wherein the identification information resolution section replies to the mobile terminal device indicating that the identification information is invalid when the time difference is out of the range of valid time indicated by the valid time information.

* * * * *